(12) United States Patent
Bauer et al.

(10) Patent No.: US 9,739,301 B2
(45) Date of Patent: Aug. 22, 2017

(54) SYSTEMS AND METHODS FOR CENTERING BEARING COMPARTMENTS

(71) Applicant: United Technologies Corporation, Hartford, CT (US)

(72) Inventors: Steven J. Bauer, East Haddam, CT (US); Christine F. McGinnis, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 201 days.

(21) Appl. No.: 14/576,687

(22) Filed: Dec. 19, 2014

(65) Prior Publication Data

US 2015/0192165 A1 Jul. 9, 2015

Related U.S. Application Data

(60) Provisional application No. 61/924,549, filed on Jan. 7, 2014.

(51) Int. Cl.
*F16B 39/10* (2006.01)

(52) U.S. Cl.
CPC ....... *F16B 39/103* (2013.01); *Y10T 29/49908* (2015.01)

(58) Field of Classification Search
CPC ............................... F16B 39/10; F16B 39/103
USPC ........................................ 411/119–123, 140
See application file for complete search history.

(56) References Cited

U.S. PATENT DOCUMENTS

| | | | | |
|---|---|---|---|---|
| 757,526 A * | 4/1904 | Varley | ..................... | F16B 39/10 411/120 |
| 851,964 A * | 4/1907 | Rosenkranz | ............ | F16B 39/24 411/136 |
| 1,707,933 A * | 4/1929 | Gibbons | ............... | F16B 39/108 411/123 |
| 4,979,872 A * | 12/1990 | Myers | ..................... | F01D 9/065 403/131 |
| 5,967,721 A * | 10/1999 | Giachinta | ............. | F16B 39/282 411/120 |
| H001981 H * | 8/2001 | Hennick | ............... | F16B 39/105 411/102 |
| 6,554,778 B1 * | 4/2003 | Fleming, III | ........ | A61B 10/025 600/567 |
| 7,544,028 B2 * | 6/2009 | Tournier | ............... | F16B 37/046 411/121 |
| 8,347,635 B2 * | 1/2013 | Durocher | .............. | F01D 25/162 29/464 |

* cited by examiner

*Primary Examiner* — Flemming Saether
(74) *Attorney, Agent, or Firm* — Snell & Wilmer, L.L.P.

(57) ABSTRACT

Systems and methods are disclosed herein for dressing centering a bearing compartment in a gas turbine engine. A nut may be inserted through an outer case of a gas turbine engine. The nut may be coupled to a strut which centers a bearing compartment. The nut may be rotated to achieve a desired tension on the strut to center the bearing compartment. A retaining plate comprising a collar may be positioned over the nut. A swaging tool comprising a swaging ramp may be positioned over the nut. The swaging tool may be forced against the retaining plate using a draw-in bolt. The swaging ramp may contact the collar and form indentations in the collar to lock the nut in place.

11 Claims, 8 Drawing Sheets

SYSTEMS AND METHODS FOR CENTERING BEARING COMPARTMENTS

CROSS-REFERENCE TO RELATED APPLICATIONS

This application is a nonprovisional of, and claims priority to, and the benefit of U.S. Provisional Application No. 61/924,549, entitled "SYSTEMS AND METHODS FOR CENTERING BEARING COMPARTMENTS," filed on Jan. 7, 2014, which is hereby incorporated by reference in its entirety.

FIELD

The present disclosure relates generally gas turbine engines. More particularly, the present disclosure relates to systems and methods for centering bearing compartments in gas turbine engines.

BACKGROUND

Gas turbine engines typically comprise a plurality of bearing compartments which support the spools of the engine with minimal friction. The tolerances for centering the bearing compartments may be very low. Centering the bearing compartments may allow for precise alignment and decreased friction of the spools. Struts which are coupled to the outer engine case may support and center the bearing compartments.

SUMMARY

A nut may comprise a head, a neck, and a locking ring. The neck may be adjacent to the head. The locking ring may be adjacent to the neck. The locking ring may define a locking slot.

In various embodiments, the head, the neck, and the locking ring may be coaxial. In various embodiments, the neck may comprise a dimple. In various embodiments, the dimple may comprise a concave depression in a lateral surface of the neck. In various embodiments, the dimple may be aligned with a lateral side of the head. In various embodiments, the head may be hexagonal. In various embodiments, the locking ring may define three locking slots. In various embodiments, the locking ring may define an annular series of locking slots about the neck. In various embodiments, the locking slot may be curved. In various embodiments, the head may comprise a threaded draw-in hole located on a top side of the head. In various embodiments, the nut may further comprise a pivot guide configured to threadingly engage a strut.

A device for centering a bearing compartment may comprise a hexagonal head, a neck, and a locking ring. The hexagonal head may comprise a threaded draw-in hole in a top surface of the hexagonal head. The neck may be adjacent to and co-axial with the hexagonal head. The neck may comprise a plurality of dimples in a lateral surface of the neck. The locking ring may be adjacent to and co-axial with the neck. The locking ring may comprise a plurality of locking slots.

In various embodiments, the plurality of locking slots may form an annular series of locking slots about the neck. In various embodiments, the hexagonal head may be configured to align a swaging ramp of a swaging tool with a dimple in the plurality of dimples. In various embodiments, the device may further comprise a pivot guide adjacent to and coaxial with the locking ring. In various embodiments, the pivot guide may be configured to engage a strut.

A method of locking a nut may comprise rotating the nut to a desired position. A locking bolt may be inserted through a locking slot in a locking ring of the nut. An indentation may be formed in a component adjacent to a neck of the nut. The indentation may extend into a dimple in the neck.

In various embodiments, the forming the indentation may comprise swaging the indentation into the component, wherein the component comprises a retaining plate. In various embodiments, the nut may be rotated while the locking bolt is located in the locking slot. In various embodiments, the rotating of the nut applies tension to a rod in order to center a bearing compartment.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Conventional systems for centering a bearing compartment may be limited to discrete positions of a nut which applies tension to a rod in order to center the bearing compartment. However, such discrete positions may limit the ability to precisely center the bearing compartment.

Systems and methods are disclosed herein for centering a bearing compartment in a gas turbine engine. A nut may be rotated in order to tension a strut which centers and supports the bearing compartment. There may be very low tolerances for tensioning the strut. The disclosed systems and methods may allow the nut to be rotated across a continuum of positions in order to tension the strut within the desired tolerance. The nut may be coupled to the outer case of the engine with locking bolts. The nut may comprise locking slots which allow the nut to be rotated to many positions while still aligning with bolt holes in the outer case. A retaining plate may be placed over the nut, and the locking bolts may be inserted through apertures in the retaining plate, the locking slots in the nut, and into the bolt holes in the outer case. A swaging tool may be tightened over the nut, and may swage indentations into a collar of the retaining plate. The indentations may be formed into dimples in the nut which may prevent the nut from rotating, allowing for precise tensioning of the strut.

Figure 1:
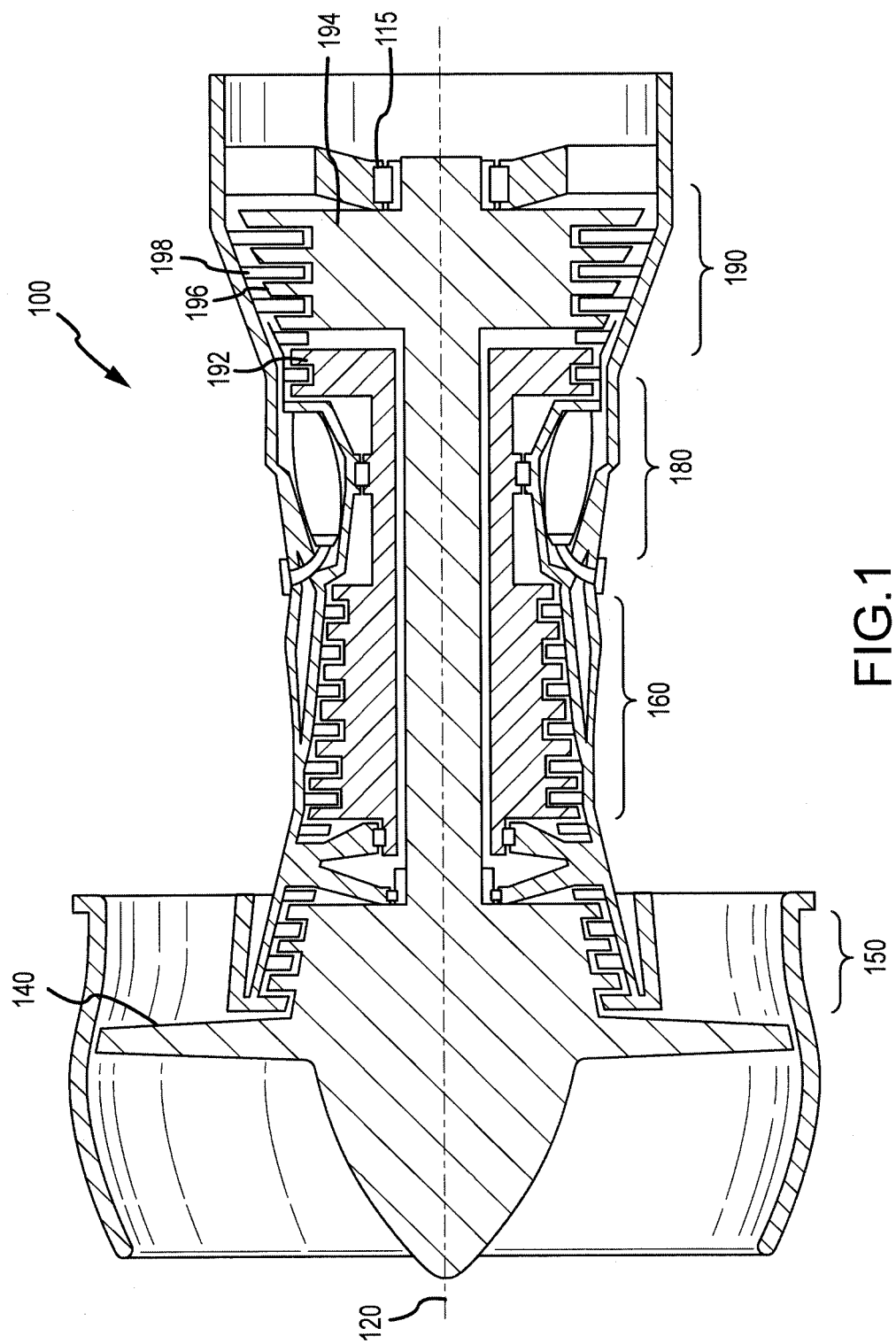
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine section 190. Turbine section 190 may include high pressure rotors 192 and low pressure rotors 194, which rotate in response to the expansion. Turbine section 190 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
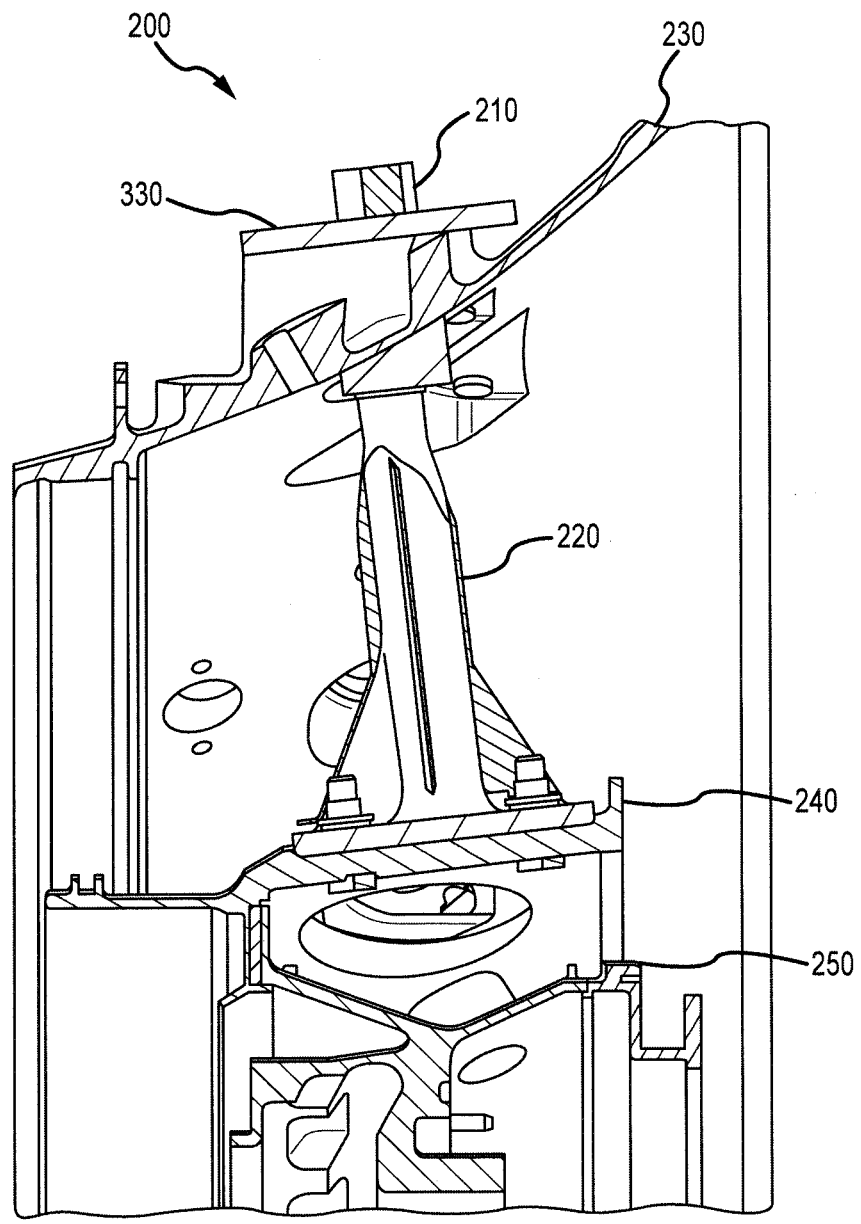
FIG. 2 illustrates a system for centering a bearing compartment in accordance with various embodiments.

Referring to FIG. 2, a bearing alignment system ("BAS") 200 is illustrated according to various embodiments. BAS 200 may comprise nut 210 and irod 220. Nut 210 may be coupled to irod 220 through outer case 230. Irod 220 may be coupled to inner case 240. Inner case 240 may hold bearing compartment 250. In various embodiments, bearing compartment 250 may be the #4 bearing for a gas turbine engine.

In various embodiments, the #4 bearing may be located at a mid turbine frame of gas turbine engine 100.

BAS 200 may be configured to center inner case 240 and bearing compartment 250. In various embodiments, engine 100 may comprise a plurality of BASs 200 circumferentially disposed about inner case 240. In various embodiments, engine 100 may comprise eight BASs 200 symmetrically disposed about inner case 240. In various embodiments, nut 210 may threadingly engage irod 220. Nut 210 may screw onto threads on irod 220, drawing irod 220 and inner case 240 toward outer case 230. Locking ring 330 may prevent nut 210 from being drawn through outer case 230. The plurality of BASs 200 may be adjusted by rotating nuts 210 until inner case 240 and bearing compartment 250 are centered to within a desired tolerance.

Figure 3:
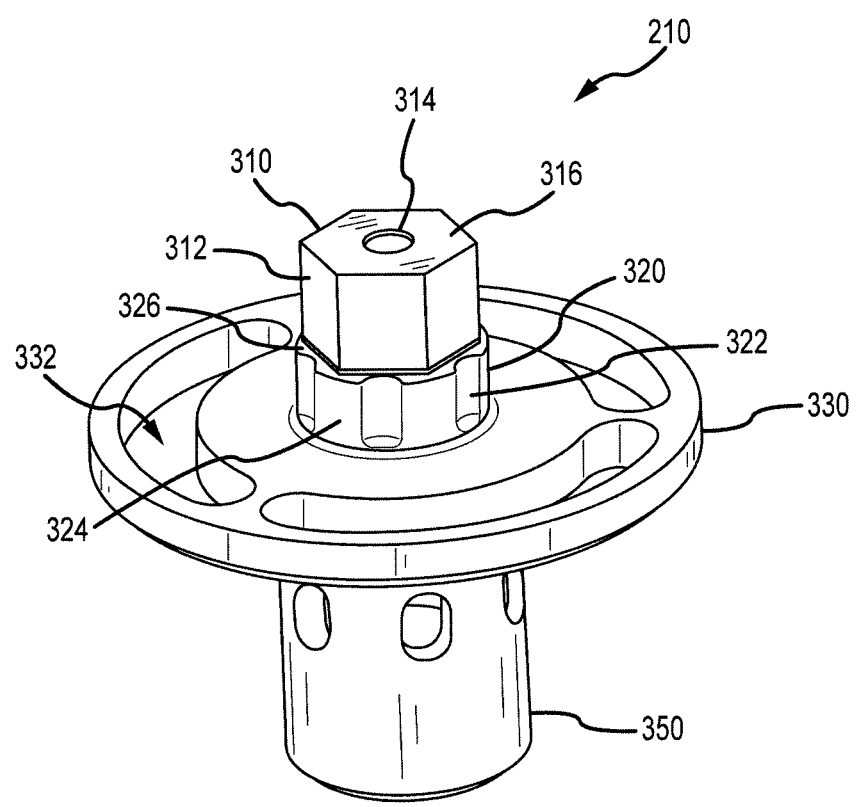
FIG. 3 illustrates a perspective view of a nut in accordance with various embodiments.

Referring to FIG. 3, a perspective view of nut 210 is illustrated according to various embodiments. Nut 210 may comprise head 310, neck 320, locking ring 330, and pivot guide 350. In various embodiments, head 310 may comprise a hex-head, such that head 310 comprises six lateral sides 312. Head 310 may define a threaded draw-in hole 314 located on a top side 316 of head 310.

Neck 320 may be located adjacent to head 310. Adjacent may refer to coupled to, contacting, axially proximate to, or near another component. Neck 320 may comprise a plurality of dimples 322 in lateral surface 324 of neck 320. In various embodiments, neck 320 may comprise a dimple 322 corresponding to each lateral side 312 of head 310. In various embodiments, dimples 322 may comprise a concave depression in lateral surface 324. In various embodiments, dimples 322 may extend into top surface 326 of neck 320.

Nut 210 may further comprise locking ring 330 located adjacent to neck 320. In various embodiments, locking ring 330 may generally comprise a disk-shaped component adjacent to and co-axial with head 310 and neck 320. Locking ring 330 may define locking slots 332. Locking ring 330 may comprise any number of locking slots 332. In various embodiments, locking ring 330 may comprise three locking slots 332. In various embodiments, locking slots 332 may be curved and form an annular series of locking slots 332 about neck 320.

Nut 210 may further comprise pivot guide 350. Pivot guide 350 may comprise a substantially cylindrical component configured to mate with irod 220 shown in FIG. 2. In various embodiments, pivot guide 350 may threadingly engage irod 220.

Figure 4:
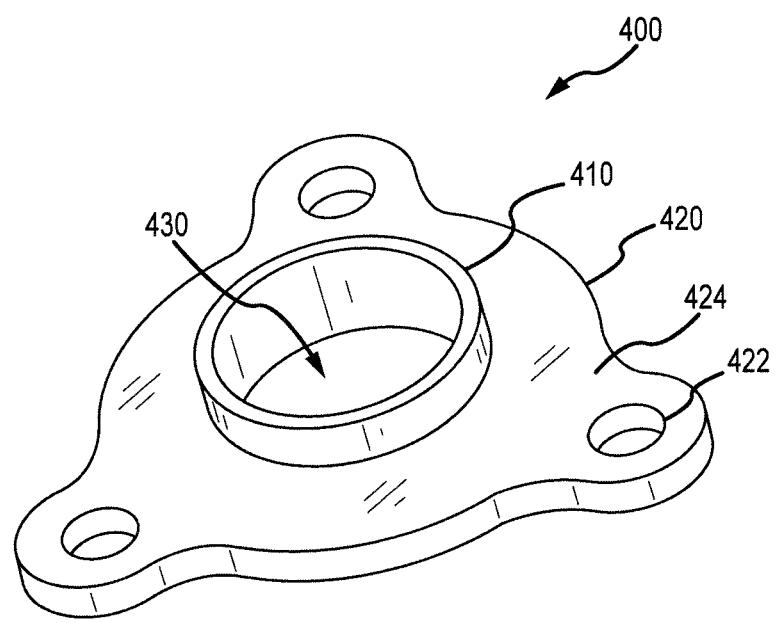
FIG. 4 illustrates a perspective view of a retaining plate in accordance with various embodiments.

Referring to FIG. 4, a perspective view of retaining plate 400 is illustrated according to various embodiments. Retaining plate 400 may comprise collar 410 and retaining body 420. In various embodiments, retaining body 420 may be substantially planar. In various embodiments, retaining body 420 may comprise an aperture 422. In various embodiments, aperture 422 may be configured to receive a locking bolt. In various embodiments, retaining body 420 may define three apertures 422. In various embodiments, each aperture 422 may correspond to a locking slot 332 shown in FIG. 3. Collar 410 may be substantially cylindrical. In various embodiments, collar 410 may extend substantially perpendicularly from a top side 424 of retaining body 420. Collar 410 may define a nut hole 430.

Figure 5:
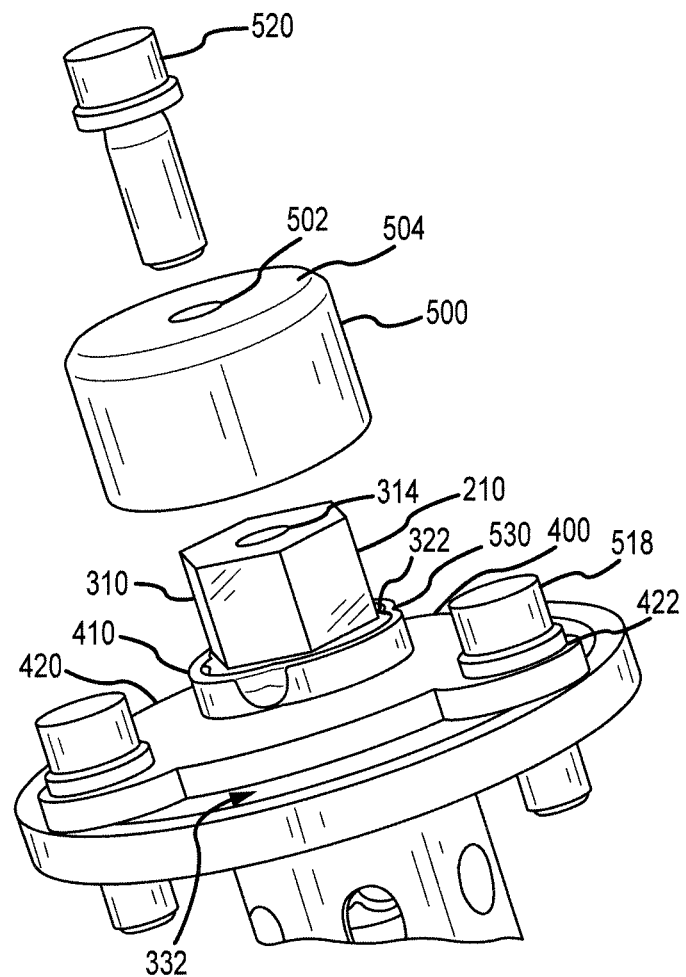
FIG. 5 illustrates a perspective view of a swaging tool, a retaining plate, and a nut in accordance with various embodiments.

Referring to FIG. 5, a perspective view of a swaging tool 500, nut 210, and retaining plate 400 is illustrated according to various embodiments. Nut 210 may be rotated to a desired position to center a bearing compartment, and retaining plate 400 may be coupled to nut 210 with locking bolts 518. Locking bolts 518 may be inserted through apertures 422 and locking slots 332. Swaging tool 500 may be placed over head 310 and collar 410. Swaging tool may define a draw-in guide 502 in a top side 504 of swaging tool 500. Draw-in bolt 520 may be inserted through draw-in guide 502 and into draw-in hole 314. Draw-in bolt 520 may be tightened by rotating draw-in bolt 520 such that threads on draw-in bolt 520 mate with threads in draw-in hole 314, forcing swaging tool 500 in the direction of retaining body 420. Swaging tool 500 may contact a portion of collar 410 and force indentations 530 radially inward on collar 410. Indentations 530 may intersect with dimples 322. Indentations 530 may prevent retaining plate 400 from rotating relative to nut 210 by contacting dimples 322.

Figure 6:
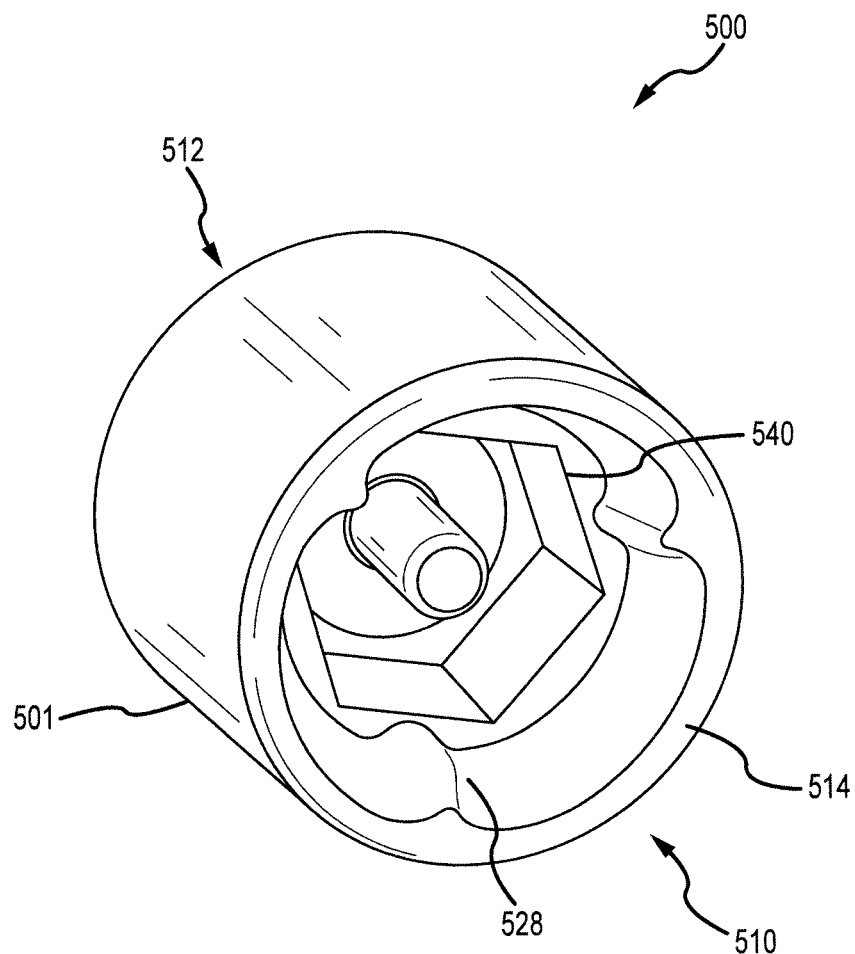
FIG. 6 illustrates a perspective view of a swaging tool in accordance with various embodiments.

Referring to FIG. 6, a perspective view of swaging tool 500 is illustrated according to various embodiments. Swaging tool 500 may generally comprise a cylindrical body 501 with a first end 510 and a second end 512. Swaging tool 500 may comprise a stop face 514 located at an outer circumference of first end 510. Swaging tool 500 may comprise a plurality of swaging ramps 528 adjacent to and extending radially inward from an inner circumference of first end 510. In various embodiments, swaging tool 500 may comprise three swaging ramps 528. However, in various embodiments, swaging tool 500 may comprise any number of swaging ramps 528. Swaging tool 500 may further comprise a guide sleeve 540. In various embodiments, guide sleeve 540 may comprise a hexagonal shape.

Figure 7:
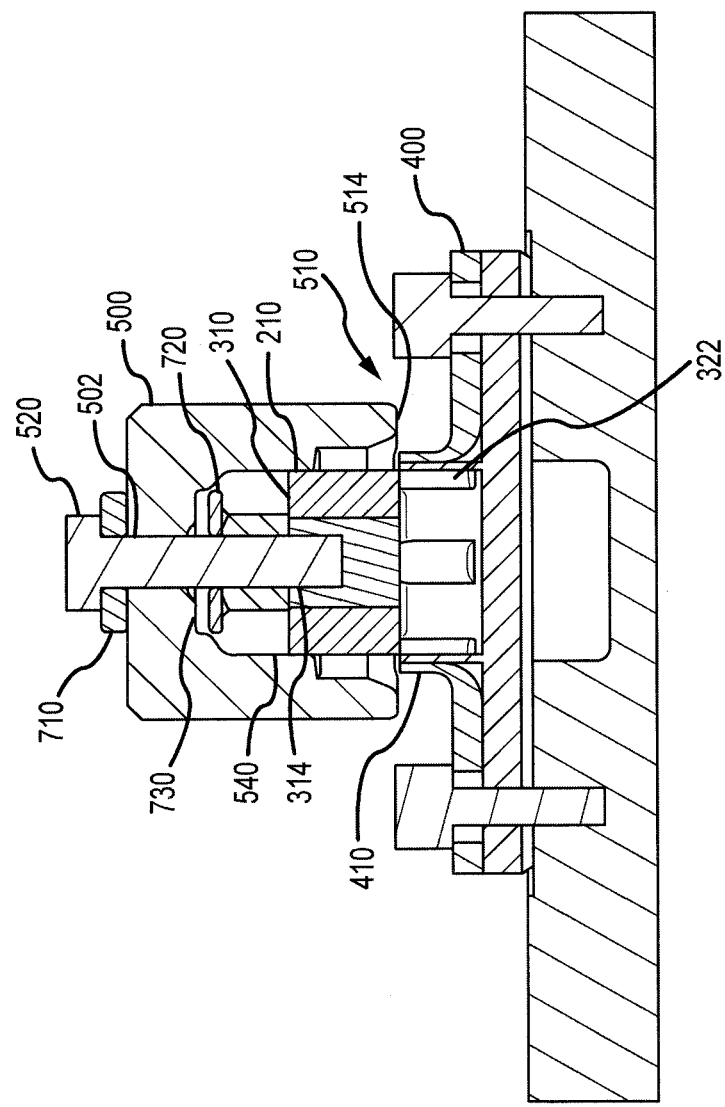
FIG. 7 illustrates a cross-section of a retaining plate being swaged in accordance with various embodiments.

Referring to FIG. 7, a cross-section view of swaging tool 500, retaining plate 400, and nut 210 is illustrated according to various embodiments. First end 510 of swaging tool 500 may be placed over head 310 of nut 210. Guide sleeve 540 may be positioned around head 310. In various embodiments, the size and shape of guide sleeve 540 may correspond to the size and shape of head 310. Guide sleeve 540 may thus align swaging tool 500 in order to swage retaining plate 400. Draw-in bolt 520 may be inserted though draw-in guide 502 and into draw-in hole 314. In various embodiments a pivot washer 710 may be positioned between draw-in bolt 520 and swaging tool 500. Pivot washer 710 may distribute pressure from draw-in bolt 520 onto swaging tool 500. Draw-in bolt 520 may be threaded into draw-in hole 314, forcing swaging tool 500 in the direction of retaining plate 400. As swaging tool 500 is forced toward retaining plate 400, swaging ramps 528 (shown in FIG. 6) may contact collar 410, creating indentations 530 (shown in FIG. 5) in collar 410. The alignment of swaging tool 500 caused by the shape of guide sleeve 540 and head 310 may align swaging ramps 528 with dimples 322, such that indentations 530 are formed within dimples 322. Draw-in bolt 520 may be further tightened until stop face 514 contacts retaining plate 400. A torque wrench may be used to tighten draw-in bolt 520 a specified amount in order to assure uniform indentations 530 in collar 410.

Swaging tool 500 may further comprise a threaded washer 720. Threaded washer 720 may be threaded onto draw-in bolt 520. In various embodiments, friction between swaging tool 500 and retaining plate 400 and/or nut 210 may increase an amount of force required to remove swaging tool 500 from nut 210 after swaging. As draw-in bolt 520 is rotated counter-clockwise to remove draw-in bolt 520 from draw-in hole 314, threaded washer 720 may be forced against removal surface 730 of swaging tool 500, which may in turn force swaging tool 500 away from nut 210 and assist with removal of swaging tool 500.

Figure 8:
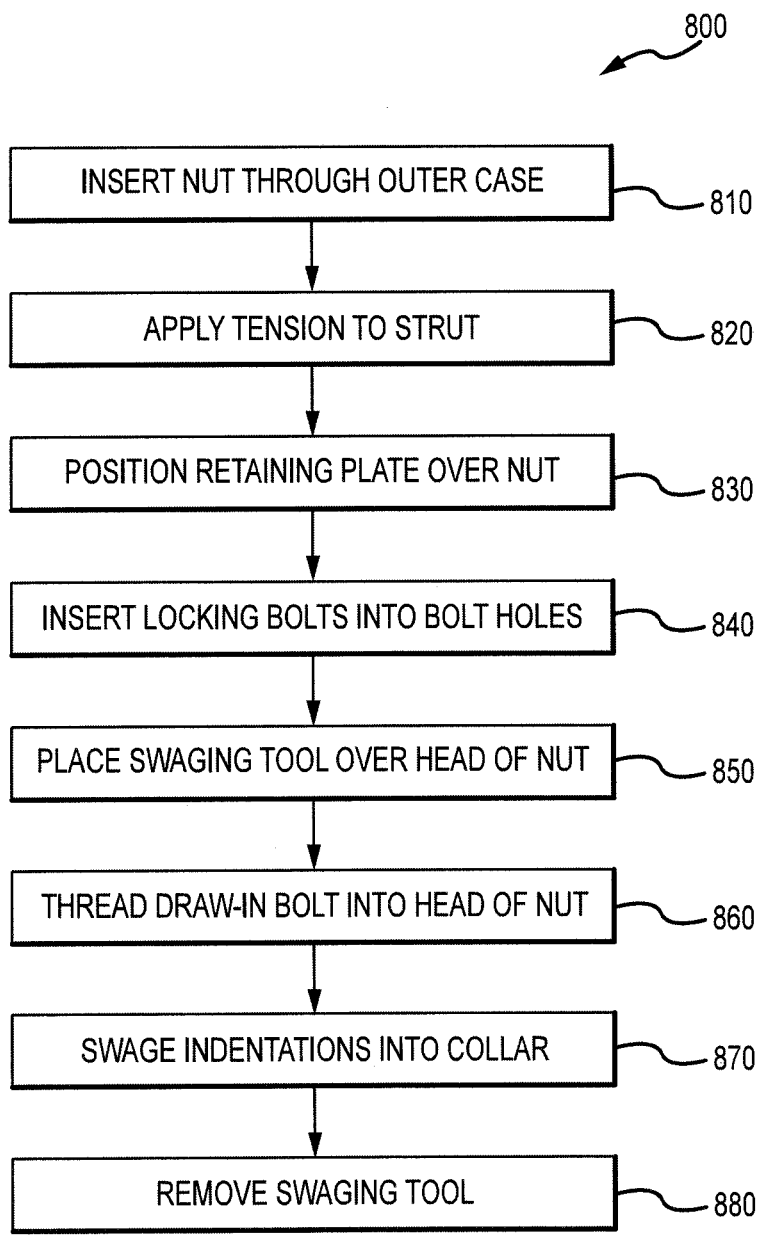
FIG. 8 illustrates a flow diagram of a process for centering a bearing compartment in accordance with various embodiments.

Referring to FIG. 8, a flowchart of a process for centering a bearing compartment in a gas turbine engine is illustrated according to various embodiments. A nut may be inserted through an outer case of a gas turbine engine (step 810). The nut may be coupled to a strut. In various embodiments the strut may comprise an irod. The strut may be coupled to an inner case of the gas turbine engine, and the inner case may hold a bearing compartment. The nut may be rotated to apply tension to the strut (step 820). Applying tension to the strut may center the inner case and the bearing compartment. The nut may be rotated until a desired tension is obtained. A retaining plate may be positioned over the nut (step 830). Locking bolts may be inserted through apertures in the retaining plate and through locking slots in the nut. The locking bolts may be threaded into locking holes in the outer case, clamping the retaining plate and the nut to the outer case (step 840). A swaging tool may be placed over a head of the nut (step 850). A draw in bolt may be inserted through a draw-in guide in a top side of the swaging tool. The draw-in bolt may be threaded into the head of the nut (step 860). The draw-in bolt may be tightened by rotating the draw-in bolt clockwise, drawing the swaging tool toward the retaining plate until a stop face of the swaging tool contacts the retaining plate.

Swaging ramps located at an inner circumference of the swaging tool may contact a collar of the retaining plate. The swaging ramps may form indentations in the collar (step 870). The indentations may extend into dimples in a neck of the nut. The indentations may prevent the nut from rotating by contacting the dimples. The draw-in bolt may be rotated counter-clockwise to remove the swaging tool from the nut. A threaded washer on the draw-in bolt may contact a removal surface of the swaging tool to assist in removal of the swaging tool from the nut (step 880).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A nut comprising:
 a hexagonal head comprising a threaded draw-in hole in a top surface of the hexagonal head;
 a neck adjacent to and co-axial with the hexagonal head, the neck comprising a plurality of dimples in a lateral surface of the neck, wherein the hexagonal head is configured to align a swaging ramp of a swaging tool with a dimple in the plurality of dimples; and
 a locking ring adjacent to and co-axial with the neck, wherein the locking ring defines a locking slot.

2. The nut of claim 1, wherein the dimple comprises a concave depression in a lateral surface of the neck.

3. The nut of claim 1, wherein the dimple is aligned with a lateral side of the head.

4. The nut of claim 1, wherein the locking ring defines three locking slots.

5. The nut of claim 1, wherein the locking ring defines an annular series of locking slots about the neck.

6. The nut of claim 1, wherein the locking slot is curved.

7. The nut of claim 1, further comprising a pivot guide configured to threadingly engage a strut.

8. A device for centering a bearing compartment comprising the nut of claim 1, wherein
 the locking comprises a plurality of locking slots.

9. The device of claim 8, wherein the plurality of locking slots form an annular series of locking slots about the neck.

10. The device of claim 8, further comprising a pivot guide adjacent to and co-axial with the locking ring.

11. The device of claim 10, wherein the pivot guide is configured to engage a strut.

* * * * *